(12) United States Patent
Wu (10) Patent No.: US 8,355,008 B2
(45) Date of Patent: Jan. 15, 2013

(54) TOUCH COMPONENT FOR PROTECTING CAPACITIVE PANEL

(75) Inventor: Mao-Sung Wu, Lujhu Township, Taoyuan County (TW)

(73) Assignee: Songtak Technology Co., Ltd., Taoyuan County (TW)

( * ) Notice: Subject to any disclaimer, the term of this patent is extended or adjusted under 35 U.S.C. 154(b) by 0 days.

(21) Appl. No.: 12/000,656

(22) Filed: Dec. 14, 2007

(65) Prior Publication Data

US 2010/0214251 A1  Aug. 26, 2010

(51) Int. Cl.
 *G06F 3/045* (2006.01)
(52) U.S. Cl. ................ 345/174; 345/173; 345/179
(58) Field of Classification Search .............. None
See application file for complete search history.

(56) References Cited

U.S. PATENT DOCUMENTS

| | | | | |
|---|---|---|---|---|
| 3,944,740 | A | * | 3/1976 | Murase et al. ............. 178/18.05 |
| 4,639,720 | A | * | 1/1987 | Rympalski et al. ........... 345/174 |
| 5,889,512 | A | * | 3/1999 | Moller et al. ................. 345/179 |
| 5,914,708 | A | * | 6/1999 | LaGrange et al. ............. 345/179 |
| 5,999,170 | A | * | 12/1999 | Ooura et al. .................. 345/179 |
| 2005/0122319 | A1 | * | 6/2005 | Sakurai et al. ................ 345/179 |

* cited by examiner

*Primary Examiner* — Sumati Lefkowitz
*Assistant Examiner* — Jesus Hernandez
(74) *Attorney, Agent, or Firm* — Jackson IPG PLLC (57) ABSTRACT

The touch component of the present invention is consisted of the main body. The said main body is a conductor used for changing current. The said main body at least includes a hand held portion and a touch portion. The said hand held portion is in touch with the capacitive panel; wherein the end of the touch portion is installed with a touch component. The said touch component is made of soft material, which when in contact with the capacitive panel the contact area of the touch component is in close contact with the capacitive panel, which enables the capacitive panel to be able to prevent being damaged due to user's excessive applied pressure.

4 Claims, 10 Drawing Sheets

TOUCH COMPONENT FOR PROTECTING CAPACITIVE PANEL

BACKGROUND OF THE INVENTION (a) Field of the Invention

The present invention is related to the design of a touch component for protecting capacitive panel, and more particularly to a design for preventing touch panel from being damaged due to excessive pressure applied.

(b) Description of the Prior Art

The touch panel market based on the physics principle of detecting touch point can be divided into: resistor type whereas the finger or other kind of touch head tips on the panel to create voltage; or the capacitive type whereas the finger is used to attract minute amount of current (usually used on the touch screen panel of notebook PC).

The top layer of the resistive touch panel is a layer of polyester film, the inner side of which has conductive metal coating. The bottom layer of the screen, to be pasted on CRT or LCD screen, is a piece of glass spread with conductive material. Between the glass and the polyester film a layer of minute separating point made of polyester is used for separation. Along the X-axis of the glass plate and the Y-axis of the polyester film there is a controller for each that will apply minute voltage gradient. Whenever the finger or a general-purpose touch pen touches the screen, the two conductive layers will be pressed together and the electronic device could detect the X- and Y-coordinate of the touch point.

Figure 1:
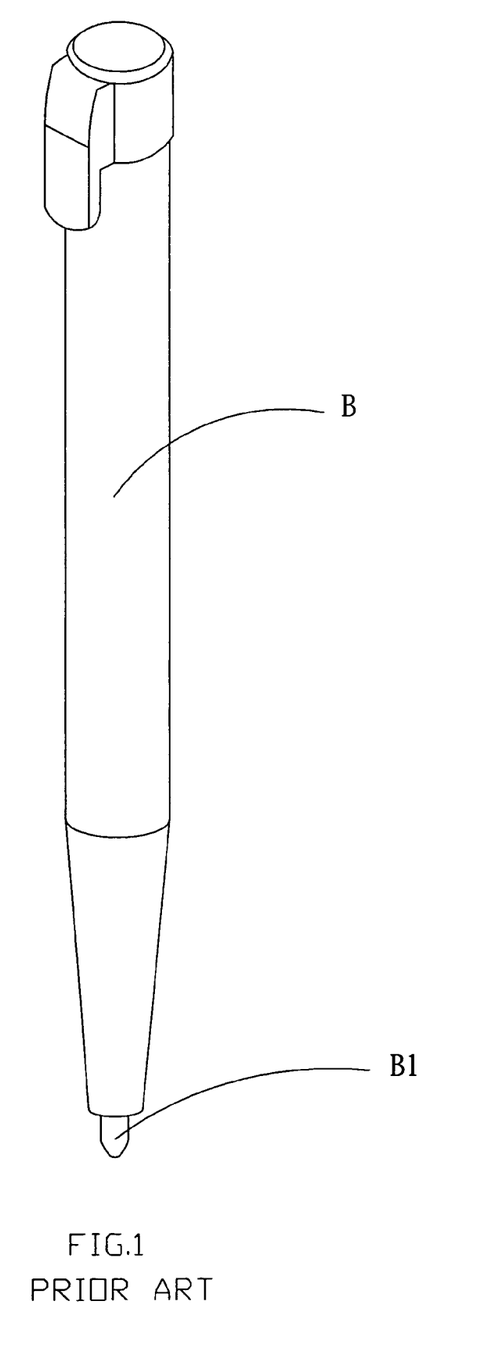
FIG. 1 is a perspective view of prior art.

In the market in general most touch screen panels are using touch pen to control the screen. However, the said touch pen requires pressing of the point for the control. Therefore, user often will leave a dark damaged mark on the touch panel screen using resistive touch panel technology because of excessive pressure applied. FIG. 1 shows a conventional resistive type touch pen comprising a pen body, one end of the pen body B is a touch pen head B1, wherein the said touch pen is a nonconductive plastic pen but require pressure for conducting operation in order to detect the X- and Y-coordinates of the touch point to achieve the purpose of touch panel control.

The innovative iPhone design presently available in the market is the combination of technology and humanity. Therefore, the circuit used in iPhone is a more complicated capacity touch panel screen. The glass plate of the capacitive touch panel screen has conductive material coated on both sides and outer side is coated with anti-scratch film. The electrodes on the peripheral of glass plate will generate an even, low voltage, electrical field on the outer conductive layer; the inner conductive layer could provide electromagnetic shield and reduce noise. Whenever the finger touches the screen, it will capacitor-couple with the electrical field on the outer conductive layer and attract the minute current. Each electrode is responsible for measuring the current from each corner for the controller to find out the coordinates of the finger. Therefore, comparing the capacitive panel with the older resistive touch panel the said capacitive panel, which could generate capacitor coupling for the detection of touch position through detecting electrical current, as human body is a good conductor, the capacitive panel can only rely on the human body or conductive object to be in touch with the changing current to achieve the result of touch panel.

Therefore, the iPhone products will not be sensitive to conventional touch pen as the conventional touch pen is not conductive and only the conductive skin of the finger can be used for conducting the operation. However, as the area of the finger has larger range, user often might select other items because of the narrow and fine selection items and result in confusion of user's operation. There is still room for improvement for such technology.

SUMMARY OF THE INVENTION

In view of this, this invention provides a kind of touch component for protecting capacitive panel in order to resolve the conventional problem of touch pen exerting excessive pressure and resulting in damage of capacitive panel.

To achieve the above stated purpose for this invention in order to meet the touch panel control element of this invention, the main body of the said touch component is a conductor as the body for conducting electrical current. The said main body comprises at least a hand held portion and a touch portion; wherein the said hand held portion is the portion for the ease of a person to hold in hands. The key point of the present invention is in the end of the said touch portion is installed with a touch component; the said touch component is made of soft material, wherein when in contact with a capacitive panel the contact area of the touch component is in close contact with the capacitive panel, which could prevent the capacitive panel from being damaged due to excessive pressure applied by the user.

A further purpose of this invention is for combination with a flexible element and a universal connector head design so as to make this invention more adaptive to other designs.

DETAILED DESCRIPTION OF THE PREFERRED EMBODIMENTS

Figure 2A:
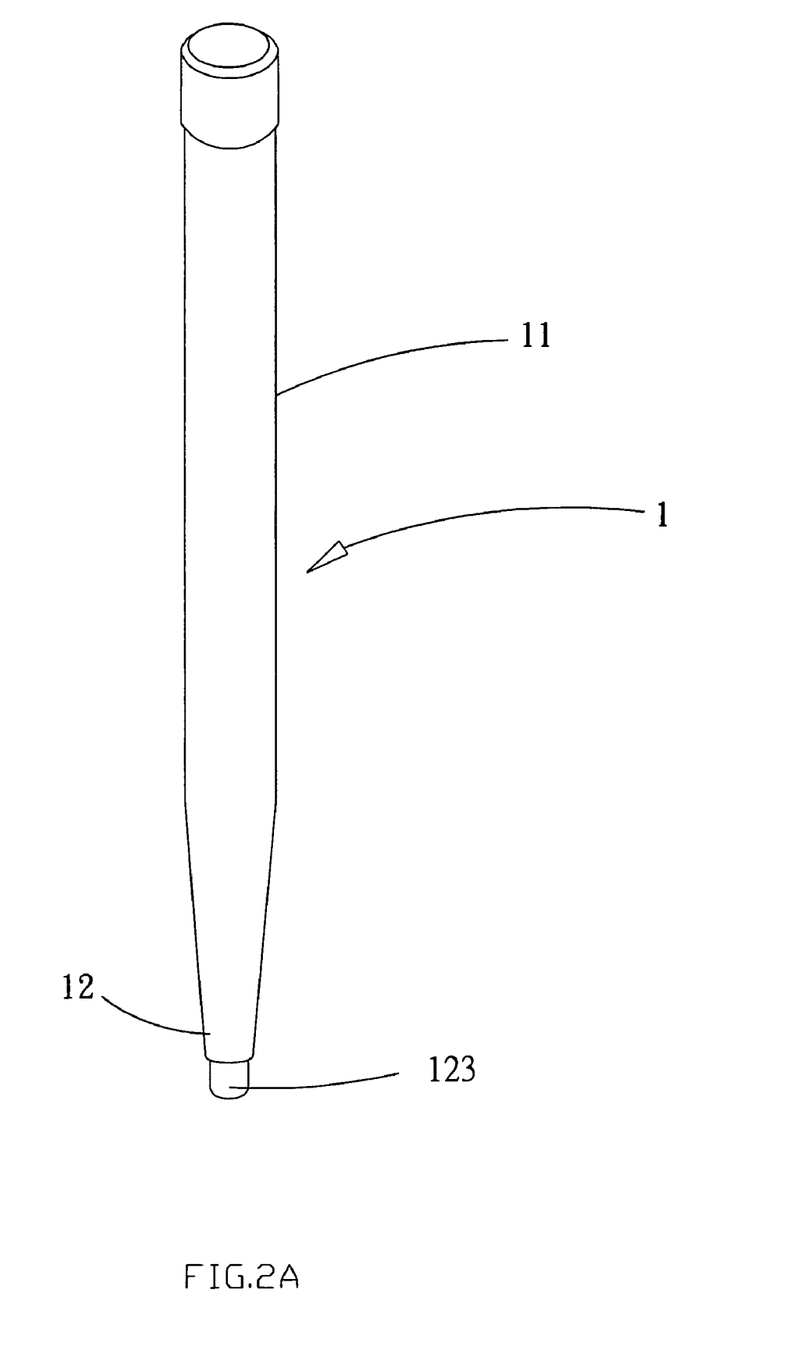
FIG. 2A is a perspective view showing the first preferred embodiment of the present invention of touch component used with the capacitive panel.
Figure 2B:
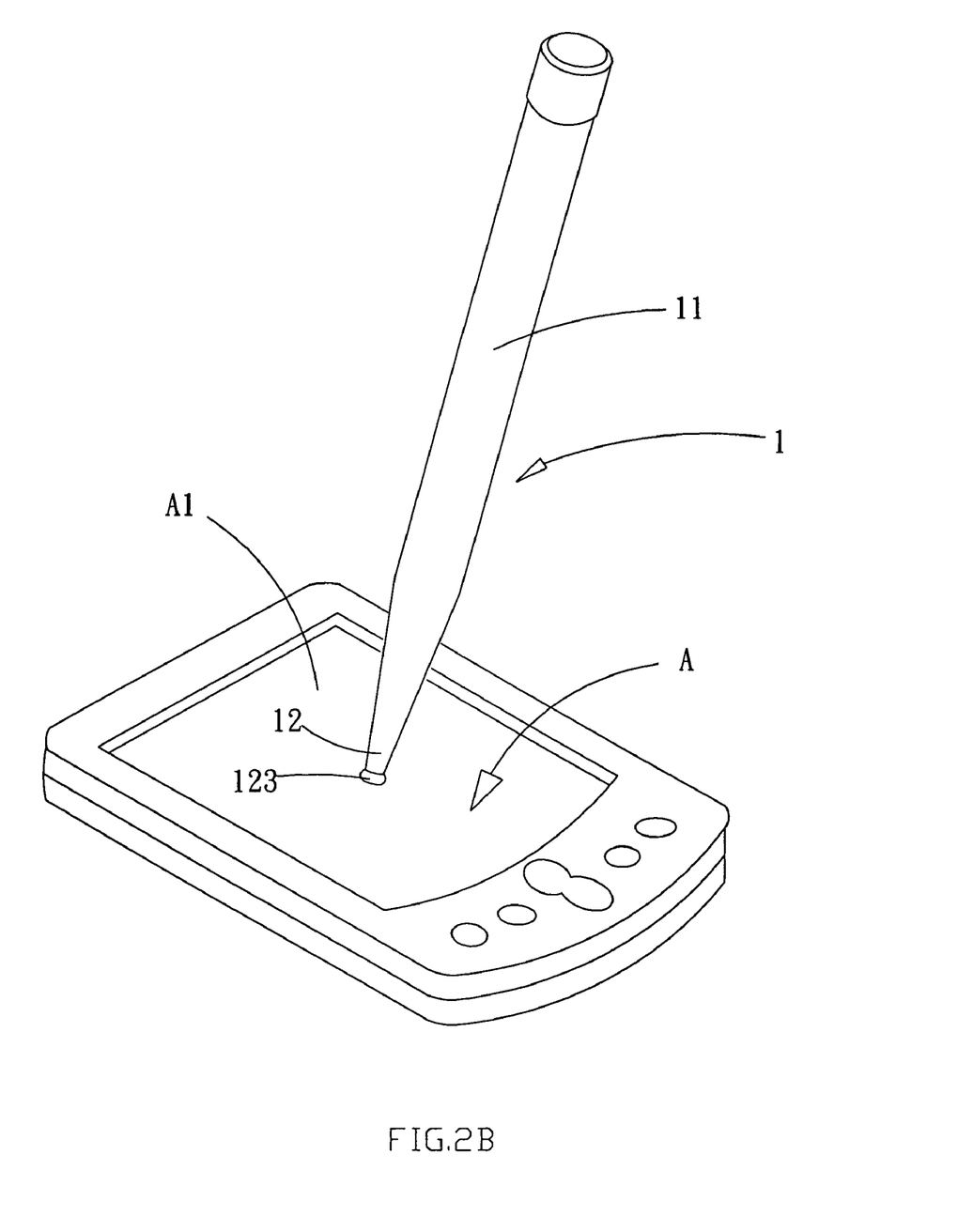
FIG. 2B is an action view showing the first preferred embodiment of the present invention of touch component used with the capacitive panel.

The basic structure of this invention in the application of "touch component for protecting capacitive panel" is schematically shown in FIGS. 2A & 2B. The said touch component is mainly made of the main body 1; the said main body 1 is a conductor for the use of a conductive body for the use to operate the said panel A through a touch component. The said main body comprises at least a hand held portion 11 and a touch portion 12; wherein the said hand held portion 11 is the portion for the human body's convenience to hold on. The key point of the present invention is in the said touch portion 12 is for the contact with a touch component 123; the said touch component 123 is made of soft material, wherein when in contact with the capacitive panel A the contact area of the touch component 123 is closely in contact with the touch panel, which could protect the capacitive panel A from being damaged due to excessive pressure applied by the user, so that the user could use touch component to operate the said panel A. When user is using the device, the hand will hold of the hand held portion 11 of the touch component to control the touch panel A and at the same time could cause capacitive-coupling with the electrical field generated on the conductive layer of the outer side of the panel A and then the human body will attract the minute electrical current so that the electrode could detect the electrical current in order to conduct touch panel operation.

In addition, the said touch component 123 can be conductive rubber or conductive plastic or other conductive material. When touch component 123 is pressed against the glass plate A1 of the capacitive panel A it will be deformed; rendering the contact area can be further in close contact with the panel A; except the original contact function of the touch component it further could protect the capacitive panel A from being scratched or being exerted with excessive pressure, causing the screen of panel A left with a damaged mark.

Figure 3:
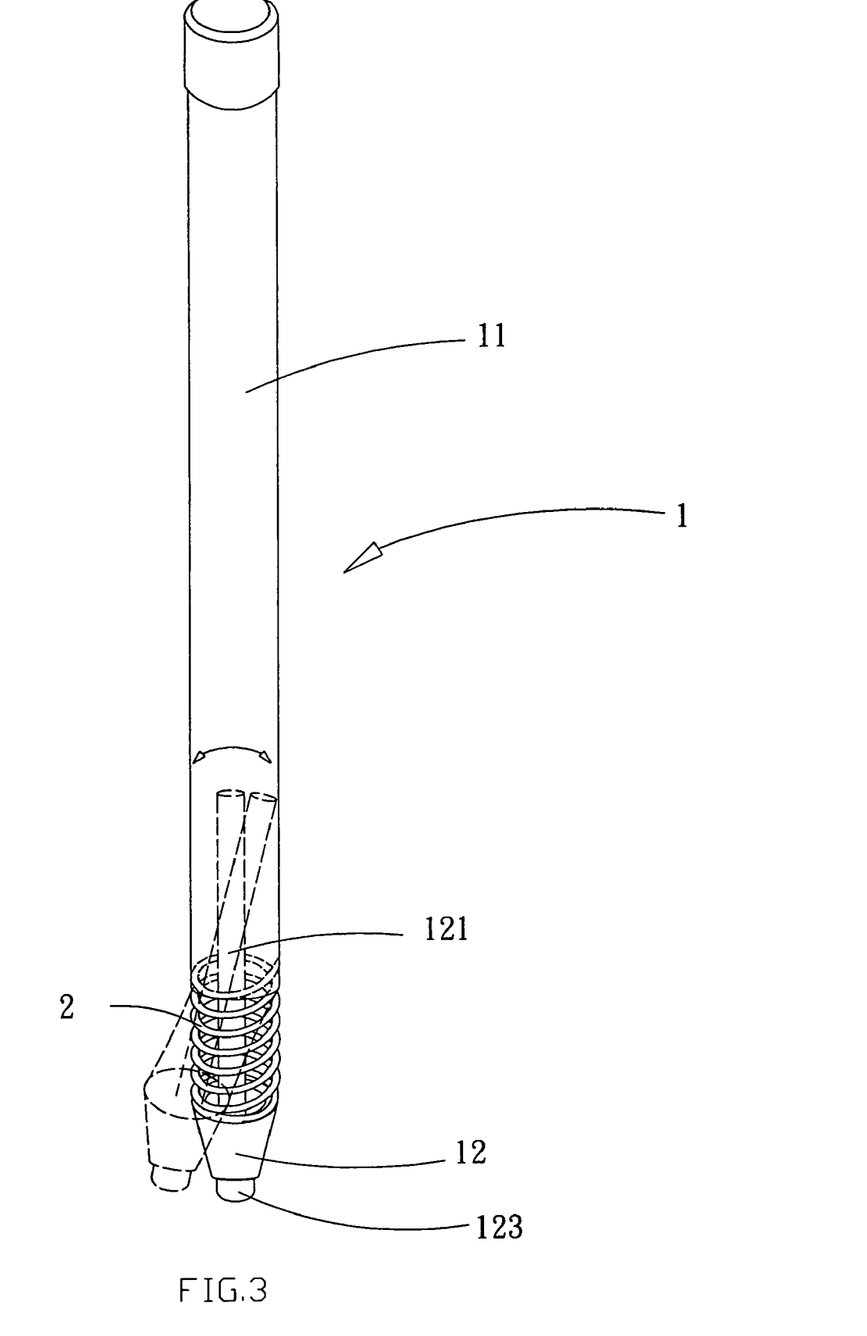
FIG. 3 is a perspective view of the second preferred embodiment of the present invention in the touch component application for capacitive panel.

Naturally, the present embodiment of touch component is as shown in the second embodiment as shown in FIG. 3. The said touch component can further contain a conductive flexible element 2; the said flexible element 2 can be a spring of woundable material; one side of the said flexible element 2 is connected to the main body 1 and the other corresponding side of the main body 1 is connected to the touch portion 12, and one side of the said touch portion 3 is installed with a touch component 123, the other side is installed with a limiting portion 121, wherein the said limiting portion 121 goes through the flexible element 2 and the internal of main body 1.

As shown in the illustration, when the said touch component 123 is in contact with the capacitive panel A, the flexible element 2 is used to adjust the angle, so that when the touch component 123 is wobbling to the right or left, the limiting portion 121 of the touch portion 12 will touch the peripheral of main body 1 at the limiting angular position without excessively large adjusting angle while the touch component 123 can be guided to contact the capacitive panel A correctly and smoothly.

Figure 4A:
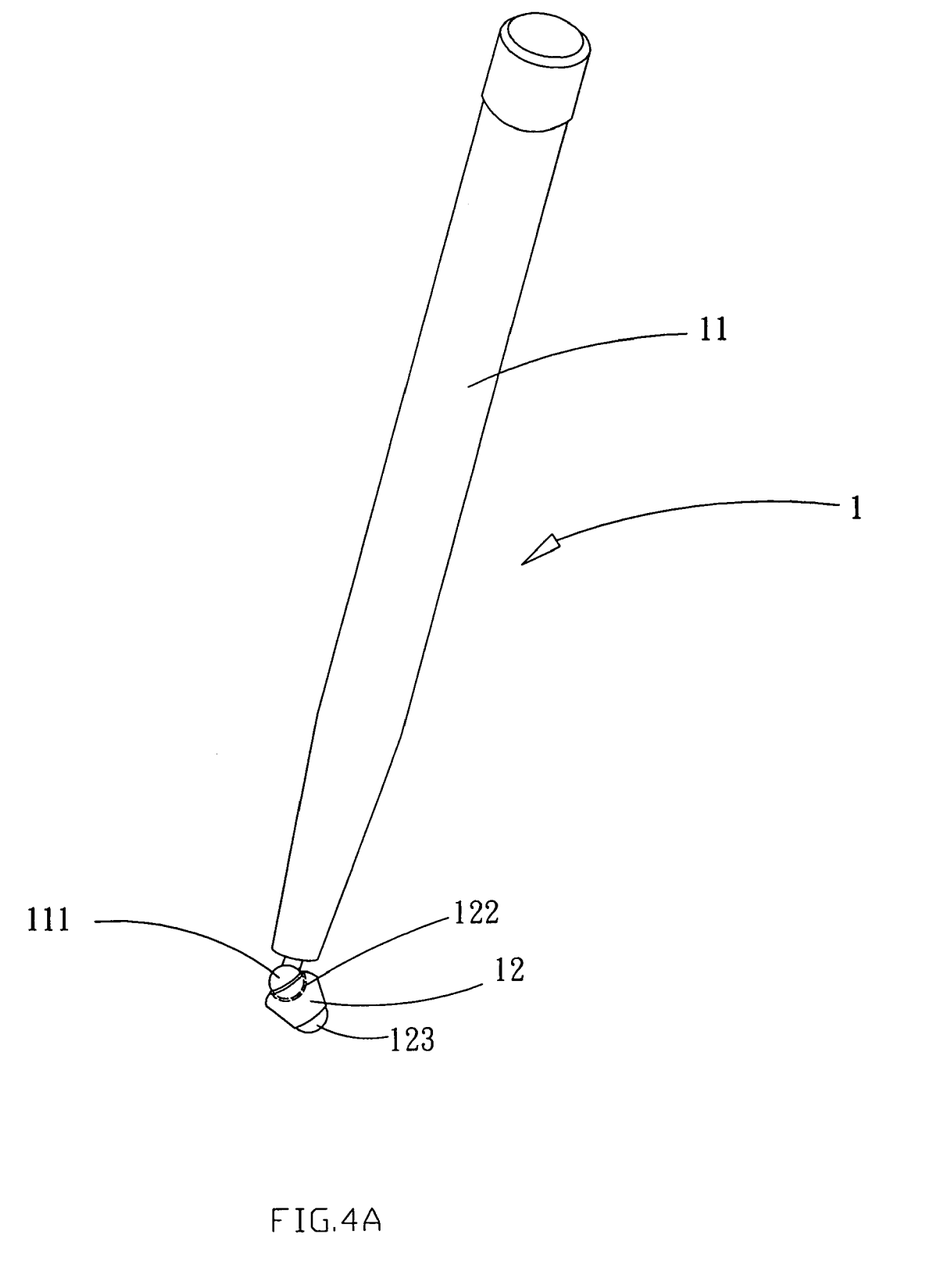
FIG. 4A is a perspective view of the third preferred embodiment of the present invention in the touch component application for capacitive panel.
Figure 4B:
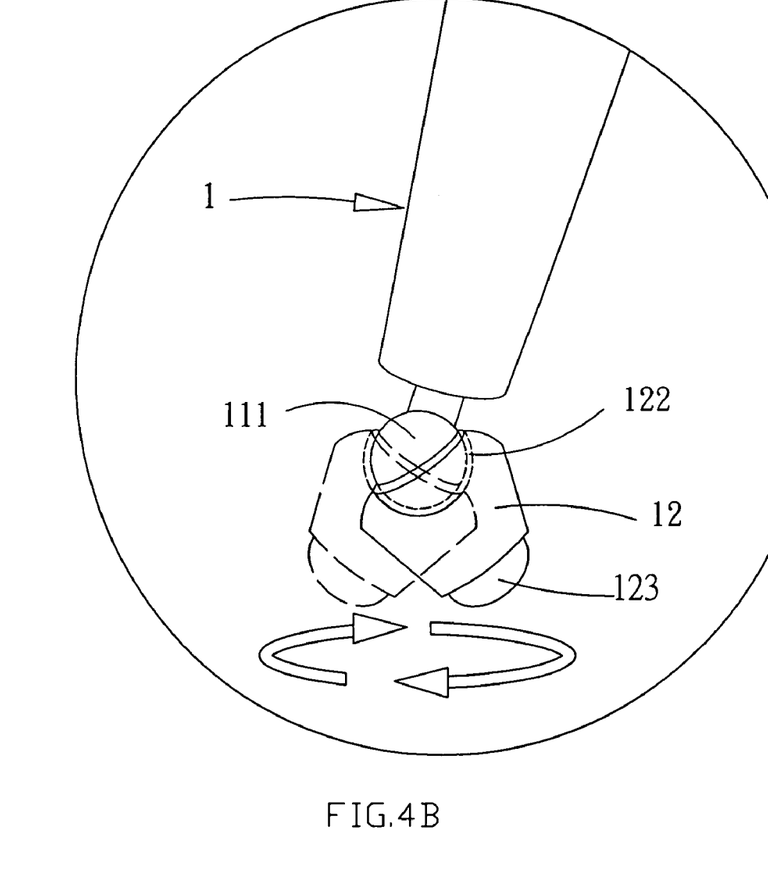
FIG. 4B is an enlarged perspective view of the third preferred embodiment of the present invention in the touch component application for capacitive panel in combination with a universal connecting head.

Again, as shown in FIGS. 4A and 4B showing the third embodiment, the said touch component can be further connected to a universal contacting head. One side of the said main body 1 is installed with a pivoting part 111. The said pivoting part 111 is in a spherical shape and one side of the said touch portion 12 is installed with a touch component 123 whereas the other side is installed with a slotting portion 122, which is slotting on the pivoting part 111 of the main body 1 so that the pivoting part 111 can rotate in all directions at the slotting portion 122 by adjusting the angle, so that the touch portion 12 is not restricted to dead angle for the user to flexibly control touch portion 12 at any angle and the touch component 123 can be guided correctly and smoothly and closely in contact with the capacitive panel A.

Figure 5:
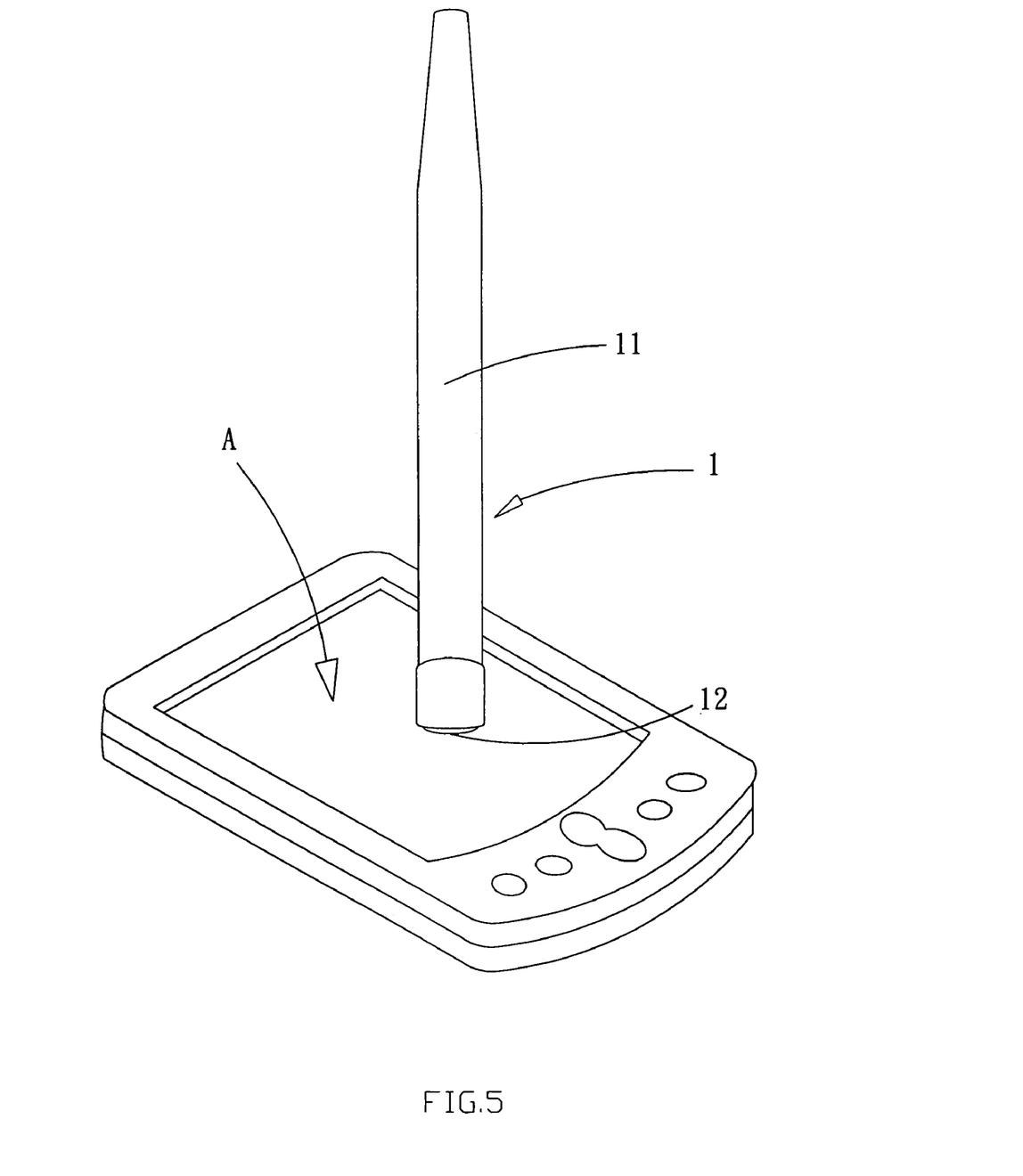
FIG. 5 is a perspective view of the fourth preferred embodiment of the present invention in the touch component application for capacitive panel.

Naturally, as shown in FIG. 5, which shows the fourth embodiment of the invention. The present invention is not limited in using one side of the main body 1 for use by touch component 123. Both sides of the main body 1 can be used for the operation.

Figure 6:
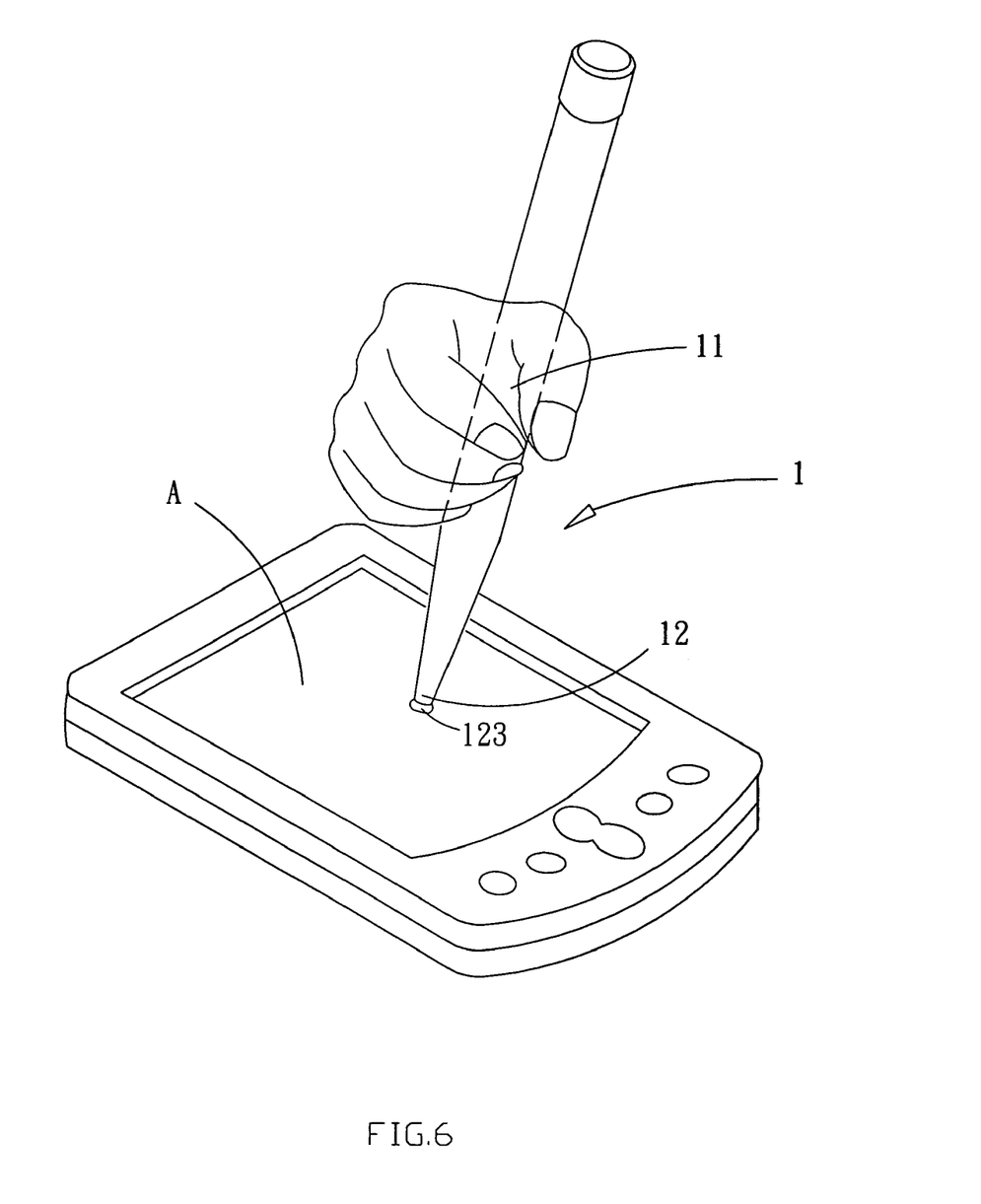
FIG. 6 is an illustration of the actual use of touch component for the application of capacitive panel.

In the practical situation, as shown in FIG. 6, the user is contacting the touch component using his hand. The hand held portion 11 of the main body 1 of this invention allows the touch component 123 of the said touch portion 12 to contact the capacitive panel A. The touch component 123 subject to pressure will deform, causing the contact area to become larger and can be further closely in contact with the capacitive panel A. Thus user could operate the said panel A through operating the said touch component. When user is using the device, the hand is holding the hand held portion 11 of the touch component to control the panel A. Alternatively, through the conduction of current, the conduction of touch component can capacitive-couple the electrical field from the outer conduction layer on the panel A and then attract the minute electrical current so that the electrode can detect the current and perform touch panel operation. As the touch component 123 is of soft material, the feeling is the same as the finger, which is for the replacement of conventional hand operating method, which further facilitates the user in selecting the desired program or file from complicated and fine selection menu and protects the panel A from being damaged due to excessive pressure.

Figure 7A:
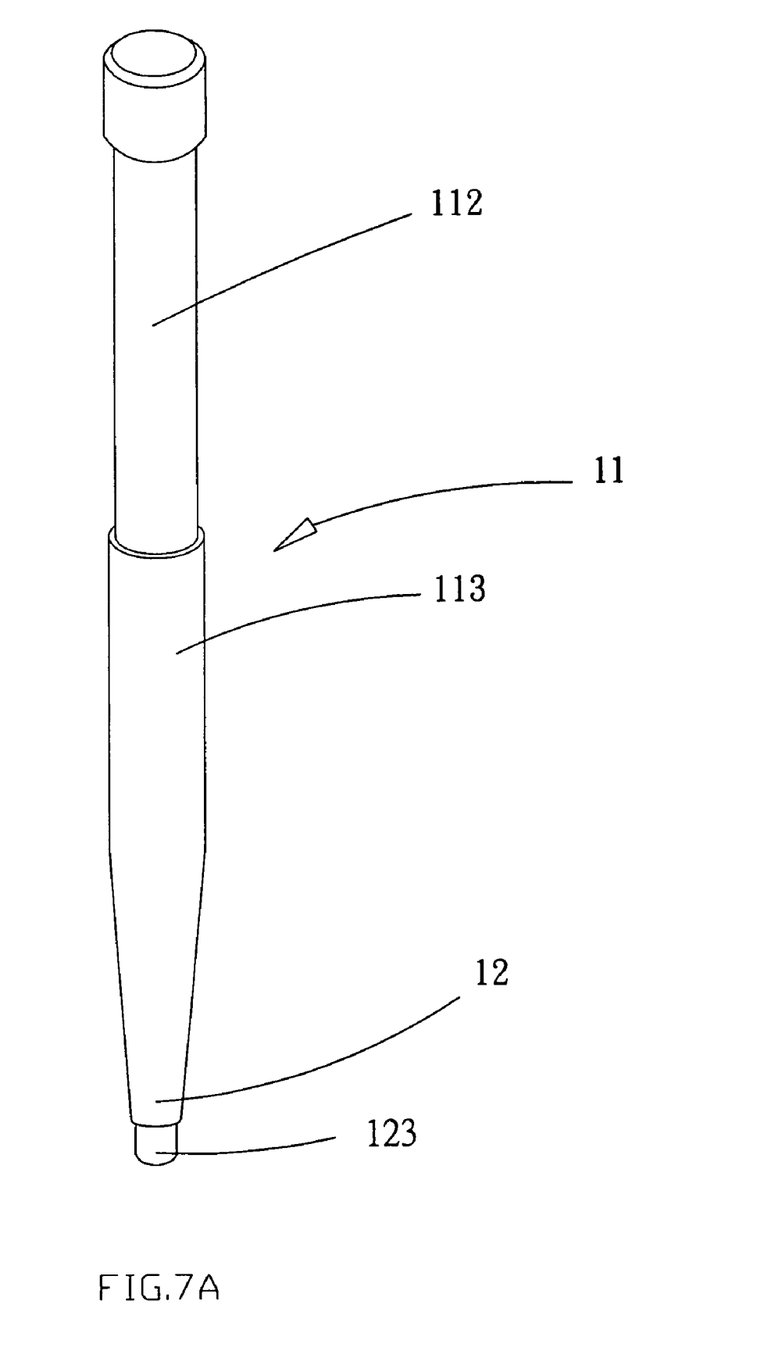
FIG. 7A is a perspective view of the fifth preferred embodiment of the present invention in the touch component application for capacitive panel.
Figure 7B:
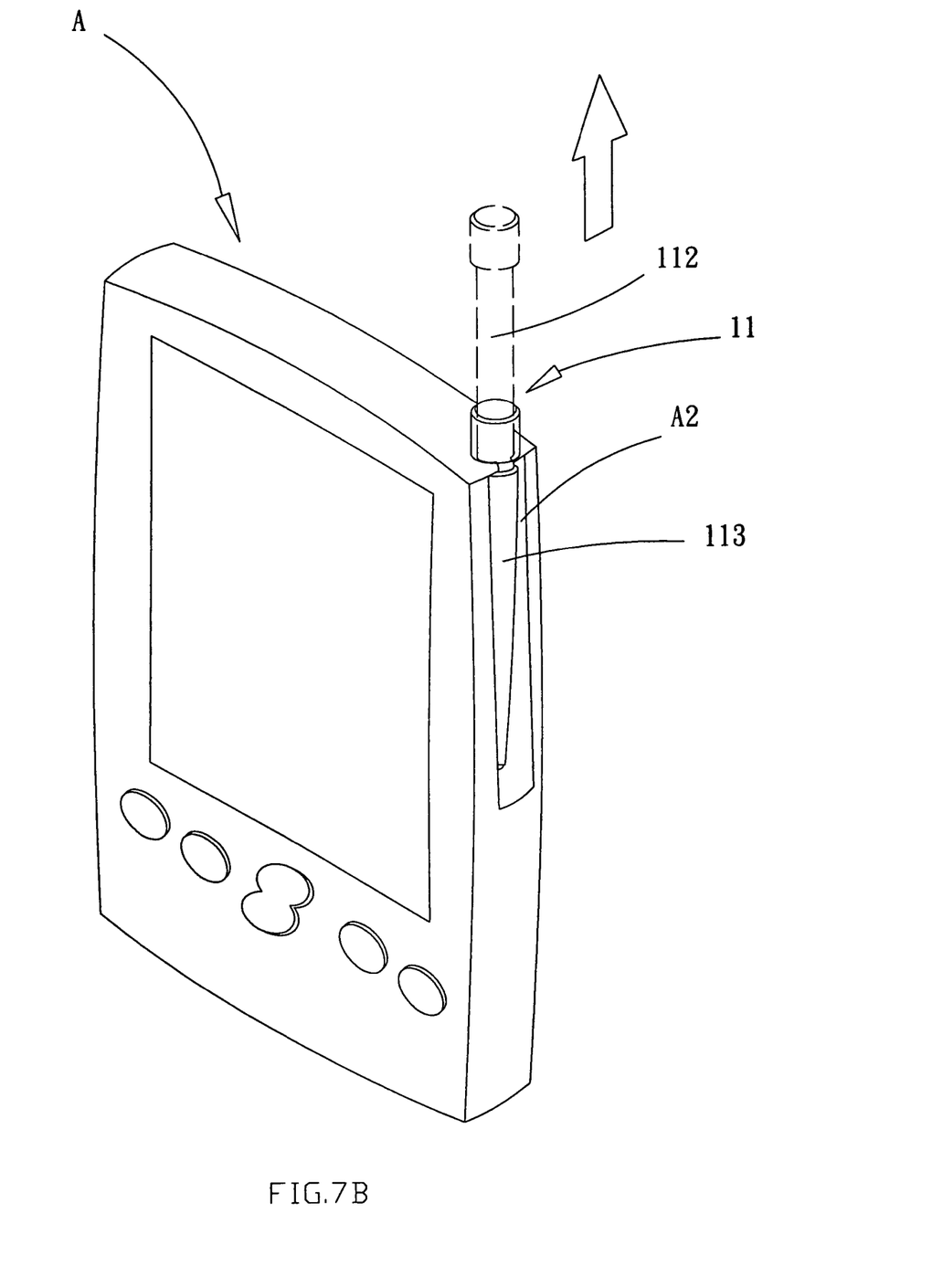
FIG. 7B is an illustration of the actual use of fifth preferred embodiment of the present invention in the touch component application for capacitive panel.

Again, to meet the requirement of portability and accommodating the shape design of the capacitive panel A this invention further can be a stretchable touch panel design. Please refer to the illustration of FIGS. 7A and 7B showing the fifth embodiment of this invention. The hand held portion 11 of the said touch component can further split into the stretching portion 112 and the stretching mouth 113. The said stretching portion 112 is connected to the stretching mouth 113 having stretching function. When user holds the stretching touch component to perform operating function or writing the stretching portion 112 can be extended for user's ease to hold. On the other hand, the stretching portion 112 can be pressed down and restore to inside of the stretching mouth 113 when not in use so as to reduce the length of the stretching portion 112 and increase the convenience of enclosure and portability.

Naturally, to accommodate the device in the use on capacitive panel A, a storage slot A2 is provided for storing the touch component. When the said touch component is not in use, the stretching portion 112 can be depressed into the stretching mouth 113 and placed into the storage slot A2 on the capacitive panel A so that the length of the touch component can be reduced and matches the requirement of the shape of the capacitive panel A. Once more, when user needs to use the touch component, the touch component can be pulled out from the storage slot A2 and the stretching portion 112 can be stretched from the stretching mouth 113 so that the touch component can be stretched in length to facilitate user in holding the device.

One thing worth mentioning is that the present invention has the following advantages as compared to prior art:
1. The soft material touch component of the present invention could protect the contact capacitive from being damaged by pressure.
2. The touch component of the present invention could be closely in contact with the capacitive panel in the contact area.
3. The touch component of the present invention could increase is the contact area at the contact point.

4. The design of the touch component and the universal connecting head of the present invention could guide the touch component correctly and smoothly in contact with the capacitive panel.
5. The touch component of the present invention can provide stretching design for proper storage after use.

As stated above, the present invention provides a preferred and feasible "Touch component for protecting capacitive panel". I hereby submit the application for new patent. The above description in the implementation and illustration is the preferred embodiment of the present invention and is not limited to this invention. Hence all structures, devices, and features having similar or close design to the present invention should all covered by the purpose and range of patent application of the present invention.

The invention claimed is:

1. A touch device for protecting and operating a capacitive panel, comprising a conductive main body and wherein the main body comprises at least
   a conductive hand held portion,
   a conductive touch portion in constant electrical contact with the conductive hand held portion and wherein the conductive touch portion comprises a conductive touch component of soft material comprising at least one of conductive rubber and conductive plastics, such that when the conductive touch component is in contact with a capacitive panel, the conductive touch component is in constant electrical contact with a user's hand via the conductive touch portion and the conductive hand held portion and wherein the resilient nature of the conductive touch component protects the capacitive panel from being damaged due to excessive pressure by the user, and
   a conductive flexible element made of a spring of wound material
   wherein rotation of the conductive touch portion is limited in at least some directions,
   wherein the conductive touch portion comprises a limiting portion configured to limit rotation of the conductive touch portion with respect to the conductive hand held portion, the limiting portion goes through the conductive flexible element and is at least partially positioned within the main body, such that when the conductive touch portion wobbles, the limiting portion touches a peripheral inner portion of the main body at a limiting angular position.

2. The touch device for protecting and operating a capacitive panel as claimed in claim 1, wherein the conductive hand held portion is further stretchable.

3. The touch device for protecting and operating a capacitive panel as claimed in claim 1, wherein the conductive hand held portion begins at a lower end of the conductive main body, the lower end being adjacent the touch portion.

4. The touch device for protecting and operating a capacitive panel as claimed in claim 3, wherein the entire length of the conductive hand held portion is conductive.

* * * * *